US008433540B1

(12) United States Patent
Saltzman et al.

(10) Patent No.: US 8,433,540 B1
(45) Date of Patent: Apr. 30, 2013

(54) EVALUATING INDIVIDUAL PLAYER CONTRIBUTION IN A TEAM SPORT

(75) Inventors: Jay A Saltzman, Hinsdale, IL (US); Kenneth L Gerber, Beaconsfield (CA)

(73) Assignee: Baselogic, Inc., Chicago, IL (US)

( * ) Notice: Subject to any disclaimer, the term of this patent is extended or adjusted under 35 U.S.C. 154(b) by 438 days.

(21) Appl. No.: 12/768,491

(22) Filed: Apr. 27, 2010

Related U.S. Application Data

(60) Provisional application No. 61/173,266, filed on Apr. 28, 2009.

(51) Int. Cl.
G06F 17/18 (2006.01)

(52) U.S. Cl.
USPC ............................................. 702/179

(58) Field of Classification Search .................. 702/179
See application file for complete search history.

(56) References Cited

U.S. PATENT DOCUMENTS

| | | | |
|---|---|---|---|
| 4,128,893 A | 12/1978 | Johnson et al. | |
| 5,868,578 A | 2/1999 | Baum | |
| 6,112,128 A | 8/2000 | Steinmetz | |
| 6,876,955 B1 | 4/2005 | Fleming et al. | |
| 7,050,868 B1 | 5/2006 | Graepel et al. | |
| 7,142,933 B1 | 11/2006 | Puma et al. | |
| 7,376,474 B2 | 5/2008 | Graepel et al. | |
| 7,699,707 B2 | 4/2010 | Bahou | |
| 8,210,916 B2 * | 7/2012 | Ma et al. ............... | 463/4 |
| 2004/0088139 A1 | 5/2004 | Blazek | |
| 2004/0162799 A1 | 8/2004 | Schisler et al. | |
| 2005/0187778 A1 | 8/2005 | Mitchell | |
| 2008/0281444 A1 | 11/2008 | Krieger et al. | |

OTHER PUBLICATIONS

Measuring How NBA Players Help Their Teams Win, 82games.com, Dan T. Rosenbaum, Apr. 30, 2004.
Dan Rosenbaum's NBA Blog: Using statistics in basketball: the bar is higher, Aug. 29, 2005.
Defense is All about Keeping the other Team from Scoring, 82games.com, Dan T. Rosenbaum, Copyright Aug. 2005.

* cited by examiner

Primary Examiner — Stephen Cherry
(74) Attorney, Agent, or Firm — Perry Hoffman

(57) ABSTRACT

Disclosed are computational features in a system for the evaluation of players and non-player factors in a team game. Evaluating the contributions of individual game factors toward a plurality of team game event results is provided with the method including the steps of identifying a plurality of team game events that each has at least one quantifiable team game event result; identifying a plurality of factor categories relevant to each of the team game events, wherein the plurality of factor categories may each take at least one of a plurality of pre-defined category-specific factor states, at least one of the category-specific factor states being defined by the participation of the individual factor in the event results, where the number of identified team game events exceeds the total number of the category-specific factor states among all the factor categories; calculating a best-fit solution to a system of equations using the category-specific factor states among all factor categories as independent variables and the quantifiable event results as dependent variables, the solution assigning a contribution value to at least one of the category-specific factor states, each of the contribution values representing an estimation of the contribution of the corresponding category-specific factor state toward each of the event results having the category-specific factor state present during the event.

20 Claims, 1 Drawing Sheet

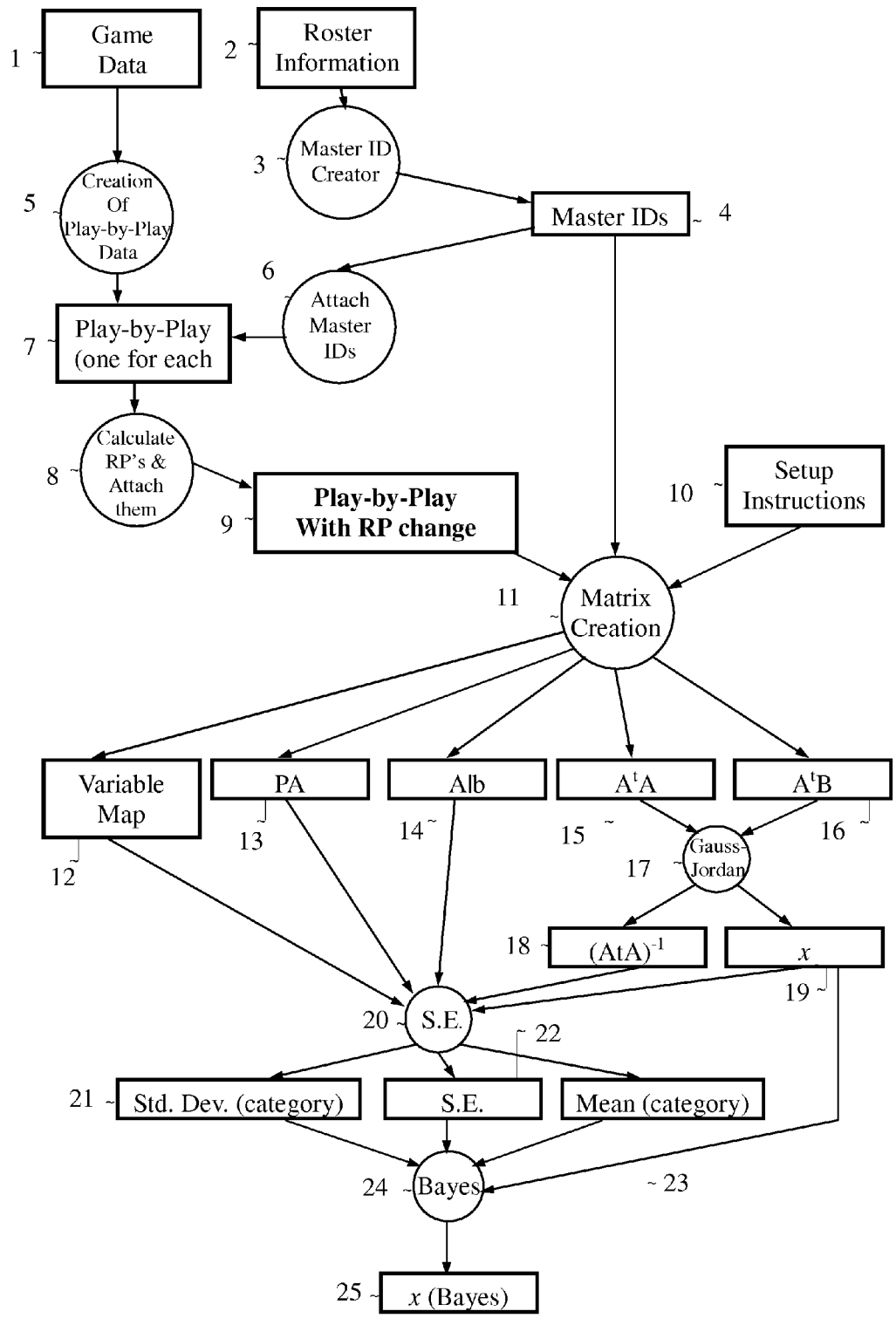

EVALUATING INDIVIDUAL PLAYER CONTRIBUTION IN A TEAM SPORT

CROSS-REFERENCE TO RELATED APPLICATIONS

This application claims priority pursuant to 35 U.S.C. 119 (e) to U.S. Provisional Application No. 61/173,266, filed on Apr. 28, 2009 which is incorporated herein by reference in its entirety.

FIELD OF THE INVENTION

The invention pertains generally to baseball statistics, also known as sabermetrics, and to other sports statistics, such as basketball statistics, and more particularly to improved individual player and factor evaluation in team sports.

BACKGROUND OF THE INVENTION

An inherent goal of any person or team playing in a sport is to win. In professional sports, not only does winning have intrinsic reward for the competitors and fans, but there may be great economic incentive as well. For example, Major League Baseball teams presently generate tens or hundreds of millions of dollars annually in revenue from ticket sales, concessions, licensing, and television contracts, and have annual payrolls averaging about $100 million per year. These revenues, and ultimately the economic success of MLB teams often depend to a significant extent on the teams' frequencies of winning and losing baseball games.

For many decades, the statistics of baseball have been deemed mathematically interesting in and of themselves and relevant to the enjoyment and understanding of the game. As such, baseball statistics have been studied increasingly intensely over the years, with new insights and strategies often being gleaned from new forms of statistical analysis. Once primarily an idle pleasure for fans of the game, baseball statistics have become even more relevant in the modern game and business of baseball, as these advanced insights permit teams to compete more favorably on and off the field of play.

To a larger degree than many other sports, baseball lends itself to generating valuable statistical information about individual players, particularly statistics pertaining to offensive performance. Unlike football, basketball, hockey, or soccer, for example, baseball has relatively little interaction between offensive teammates in the act of scoring runs in baseball. While offensive teammates in other sports may pass the ball or puck to one another to create or improve a scoring opportunity, a batter stands relatively isolated from teammates while in the batter's box, facing the opposing defense, most notably the pitcher. Also, while defense in baseball is more of a team-oriented endeavor than offense, the widely accepted importance of the pitcher and his pitching ability dominating the defensive contribution gives some individualism to the pitcher's efforts as well.

Traditional statistics in baseball have included both accumulative statistics, such as a batter's home runs (HR), triples (3B), doubles (2B), hits (H), runs batted in (RBI), and runs scored (R), and frequency measures, such as, most famously, batting average (AVG). Both types are common with pitching statistics as well, with innings pitched (IP), batters faced (BFP), strikeouts (K), walks issued (BB), hits allowed (H), earned runs allowed (ER), wins (W), losses (L), and saves (S) being some of the more well known accumulative pitching statistics, and earned run average (ERA), the average earned runs allowed per nine innings pitched, being the most famous frequency measure for pitchers. Many other statistics have been developed over time, and some have become more recognized, understood, and accepted by even more casual fans of the sport. Traditional accumulative defensive statistics (not including pitching) have included putouts (PO), assists (A), errors (E), and total chances (TC), the sum of the first three. Using these statistics, the frequency measure of fielding percentage (FP) may be calculated.

More recently developed statistics have attempted to address some of the vagaries and inequities of the traditional statistics when used for comparing players to one another statistically for the sake of determining which player is better and by how much. With regard to offense, frequency statistics like on-base percentage (OBP), slugging percentage (SLG), and their sum, on-base plus slugging (OPS) have been recognized by many as superior to more traditional frequency statistics like AVG because the newer ones do not ignore the number of walks a batter has earned or the type (number of bases) of hits a batter has achieved.

Statisticians have found certain ways to normalize these statistics, such as trying to account for certain inequities present in the environments under which different players were playing. For example, baseball has the unusual trait of having a field of play that is somewhat loosely defined by rules. While the bases and pitching rubber are positioned at fixed distances and angles relative to one another, fields may vary considerably in terms of the distance to the outfield fence, the height of the fence, the amount of playable foul territory, the quality of the hitting background (the background a batter sees for visual contrast as the pitched baseball approaches him), and other environmental conditions such as air temperature, humidity, wind, lighting, etc. In an attempt to provide more comparable statistics for players, some have created "ball park factors" meant to indicate how easy or difficult it is to score runs or hit home runs in certain ballparks, using the ballpark factors to adjust other statistics into a more fairly comparable state.

Defensive statistics have notably lagged offensive statistics in terms of their ability to reflect a player's contribution. While known offensive measures still have room for improvement, the traditional "best" defensive statistic of fielding percentage, a number that reflects the frequency that a particular player commits an error relative to the total number of "chances" he faces, is now widely recognized as having particularly significant shortcomings. Among these is the fact that identifying a play result as an error is a very subjective human decision made by a different official scorer in each ballpark. Also among these shortcomings is the fact that players who have greater range and get to more balls (i.e., have higher TC numbers) often have more errors because their chances are, on average, more difficult than those with less range who handle only balls hit more directly to them. The additional range, however, may more than offset a lower fielding percentage.

Many advanced statistics have been created to normalize one or two statistics relative to one or two variables in order to achieve "fairer" statistics for comparison purposes, especially on offense in baseball. Many times, however, other factors that have not been normalized continue to plague the "normalized" data and still render it dubiously fit or completely unfit for its desired purposes. On defense, some have tried other techniques, with disputed degrees of success. There have been a number of variants of the "Zone Rating", for example, where it is attempted to measure what percentage of balls hit within a particular topographical zone on the field, defined as the responsibility of a particular fielder, such fielder manages to successfully field. The problems tend to come in defining the zones and normalizing for teammates, ballpark, and other variable conditions. If one were trying to rate a centerfielder using this method, for example, one can define a particular area on the field (often done with polar coordinates—i.e., angles and distances from the back corner of home plate), but often a centerfielder may start to the left or right of the center of that area based on a hitter or pitcher's handedness or skill set. Similarly, he may start shallower or deeper than would be ideal to cover the pre-defined area. Typically, for example, fielders adjust their starting points from batter to batter as the batter-pitcher match ups change and the base-out situations change. Often, a fielder even moves within a single batter's plate appearance as the hitting count may affect various strategies and probabilities. A player may even start a play completely outside the zone he is being statistically measured to cover or not within any of the multiple zones he may be assigned to cover. When certain "extreme pull" hitters bat, for example, based on that hitter's tendencies, the fielders may radically shift position on the field.

There is no widely accepted valuable measure of team defense in baseball, and many rely on very crude data, such as the total number of errors committed by all the players on the team, the total fielding percentage of the team, or the total number of unearned runs allowed by the team. Thus, there is a significant need for better evaluative statistics relating to individual and team defense in baseball and cooperative team activities in sports generally. In particular, there is a need to achieve normalization with regard to a wider array of variables that may dissimilarly affect different players and different teams.

Other sports also have these issues, and basketball is another in particular that has a great need for enhanced statistical analysis to evaluate players, especially given the nature of play in the sport and the economics behind professional basketball. Many accumulative and frequency statistics have been used and developed for individual players for basketball as well, and some teams statistics have been developed as well, though many are just the sum of the statistics of the teams' players. Points scored (P), offensive rebounds (OR), defensive rebounds (DR), total rebounds (R), assists (A), steals (S), blocked shots (B), free throws made (FTM), free throws attempted (FTA), fouls committed (F), minutes played (M), games played (G) are examples of accumulative statistics used in basketball, while field goal percentage (FG %), free throw percentage (FT %), points per shot (PPS), minutes per game (M/G), points per game (P/G), rebounds per game (R/G), and assists per game (A/G), steals per game (S/G), and blocked shots per game (B/G) are examples of frequency statistics used in basketball.

Basketball, however, is a very team-oriented game, and when a particular player changes teams, it is common to see big changes in the statistical results or contribution from such player. Different players have different skill sets that may or may not work well together as the players pass the ball to one another on offense looking for a shot that maximizes the team's scoring expectation on a particular possession of the basketball. Some teams may have many players proficient at shooting, but not enough that are proficient at making passes that get the shooters "open" for shots. Other teams may excel in getting open shots, but don't have the shooting expertise to convert these opportunities with sufficient frequency to compete effectively. Thus, it is very difficult to compare the overall value or contribution of individual players because their roles may vary on different teams, but also on the same team as different teammates are substituted for one another within a game. Also, a particular player may look more productive on one team than another, say a good shooter who may have good passers on one team but not another. Thus, the conventional accumulative and frequency measures do not do particularly well at effectively comparing the relative abilities of individual players. As a general manager of a professional sports team, however, these are the types of comparisons that must be attempted to try to build a winning team, especially given the constraints of payroll or league salary caps. Thus, there is great need in very team-oriented sports, such as basketball, to develop improved measures of individual player contributions to facilitate building a better team.

SUMMARY OF THE INVENTION

A preferred embodiment of the invention is a method of evaluating the contributions of individual game factors toward a plurality of team game event results, the method including the steps of identifying a plurality of team game events that each have at least one quantifiable team game event result, identifying a plurality of factor categories relevant to each of the team game events, wherein the plurality of factor categories may each take at least one of a plurality of pre-defined category-specific factor states, at least one of the category-specific factor states being defined by the participation of the individual factor in the event results, where the number of identified team game events exceeds the total number of the category-specific factor states among all the factor categories, calculating a best-fit solution to a system of equations using the category-specific factor states among all factor categories as independent variables and the quantifiable event results as dependent variables, the solution assigning a contribution value to at least one of the category-specific factor states, each of the contribution values representing an estimation of the contribution of the corresponding category-specific factor state toward each of the event results having the category-specific factor state present during the event. In preferred embodiments of the invention, the method may be programmed and carried out on a machine, such as a computer, or may be programmed onto a computer-readable medium such as a CD-ROM or a hard drive.

DESCRIPTION OF DRAWING

FIG. 1 shows a flowchart illustrating an embodiment of the invention.

DETAILED DESCRIPTION OF EMBODIMENTS

Disclosed herein is a method for the evaluation of players and non-player factors in a team game. There are many embodiments of this invention, and herein are described the presently most preferred embodiments.

In a first preferred embodiment of the invention, the method may be used to approximate the relative contributions of all the players and all or most other known factors toward the outcome of a professional baseball game. A first step in the method is to identify a number of team game events that each have a quantifiable result that contributes to (or entirely or aggregately constitutes) the game result. In a preferred embodiment for baseball, a single plate appearance of a batter is the team game event, and the quantifiable result of the event is the difference in run potentials for the offensive team immediately after the plate appearance was concluded as compared with the run potential that existed immediately before the plate appearance began.

As noted in *The Hidden Game of Baseball* by John Thorn and Pete Palmer (Doubleday & Company, Inc., 1985), the entirety of which is hereby incorporated herein by reference, each base-out situation has a certain potential for scoring runs associated with it. In particular, each of the 25 base-out situations that may exist when a plate appearance begins or is concluded has a mean number of runs that a team is expected to score on average over many trials starting with that base-out situation. The situations are defined as follows: the number of outs may be zero, one, two or three. If there are three outs, the remaining potential for runs is zero because the half-inning is over. If it is zero, one, or two, then each of first, second, and third base may be occupied or unoccupied by a base runner. Thus, not including the $25^{th}$ state (3 outs), there are 24 other states, $3\times2\times2\times2$. These 25 states and any runs actually scored on a play represent the values whose difference is taken to measure the positive or negative change in run potential that is a preferable quantified result of a plate appearance. Large amounts of actual data are preferably used to retrospectively calculate run potentials for each of the 24 non-zero base/out situations, preferably all the Major League Baseball (MLB) data for a single year, or at least for a single league (e.g., National or American) in a single year. With the introduction of interleague regular season play many years ago now in MLB and with most other sports leagues (NBA, NFL, NHL, MLS) having regular season play between teams in opposite halves of the league, full league data is considered most preferable for calculating run potentials.

The inventive method could be used with other game event results, such as a binary result from having won or lost a game, from having a positive or negative outcome in a play or plate appearance (e.g., increase or decrease in run potential), or even the trinary positive, negative or zero effect of a pitch (e.g., change in hitting count). Similarly, run potentials can be calculated using hitting/pitching counts within a plate appearance and each pitch could represent the game event rather than a whole plate appearance. In other sports, the entire game could be a single event or a single play within a game could constitute the event. For example, in football one could use a single snap of the football as a play and scoring potentials could be calculated based on the yard line the ball was on, the down, the amount of time left in a quarter or the game, and various other optional factors. In basketball, for example, one could use a single possession of the ball as a game event with the number of points scored (optionally over or under an average number) constituting the quantifiable game event result.

After identifying the game event and the quantifiable result associated with the game event, the preferred method involves identifying a number of factors that sometimes or always contribute to the game event and the game event results. One can be comprehensive or focused in this endeavor, with any focusing preferably favoring factors that contribute to the greatest extent to the game event results. Since one preferred embodiment of the invention involves the mass or sequential elimination of factors that have proven to be relatively non-contributory toward the game event results, it is presently considered preferable to be overinclusive than underinclusive in the initial selection of factor categories; thus a fairly comprehensive list is preferably desired. For professional baseball, using the plate appearance as the event and the change in run potential as the result, one may consider factor categories such as the identity of the hitter, the identity of the pitcher, the identity of the catcher, the identity of the first baseman, the identity of the second baseman, the identity of the shortstop, the identity of the third baseman, the identity of the leftfielder, the identity of the centerfielder, the identity of the rightfielder, the identity of the ballpark, the time of the game, especially whether it is played during the daytime or at night, the identity of the home plate umpire, the identity of the offensive manager, the identity of the defensive manager, the handedness of the hitter, the handedness of the pitcher, the number of pitches the pitcher has already thrown in the game, the number of times the hitter has already faced the pitcher in the game, the base-out situation, the particular half-inning of the game, the score or score differential of the game, the place in the batting order, the number of plate appearances by the batter in the game, the defensive position being played by the batter, or the temperature of the air during the game. All of the above are easily and objectively identified at the time of each plate appearance. Optionally, such factor categories could also include the identities of any baserunners, the identities of other umpires, the velocity of the wind at game-time, and other such things that may be recorded as objective facts. It is perceived that each of such things may, to a greater or lesser extent, affect the expected change in run potential of a particular plate appearance. For example, a defensively adept centerfielder may lower the expected run potential due to his defensive prowess, while a home-plate umpire with a "tight" strike zone may increase the run potential since he gives the batter a relative advantage to the pitcher generally, especially for the frequency of walk outcomes versus strike out outcomes.

After choosing the factor categories, the preferred method includes compiling a complete list of the states those factor categories may assume over the universe of data being considered. For example, for one MLB season, the category associated with the identity of the second baseman must include factor names associated with each individual who played second base for at least one MLB plate appearance in the season. For factors taking numerical form rather than identity form, such as the air temperature, the states may optionally be grouped into numerical ranges, such as 5 degree ranges for the air temperature rather than 1 degree ranges. Like other categories, the air temperature category should preferably include all the values, say in degrees Fahrenheit, that were recorded as a game temperature for every game that season. Obviously, this means that there may be a large number of factor states that many of the factor categories could assume, and when all the factor categories are considered for a particular model, there may be several or many thousands of factors.

In a preferred embodiment of the invention, the factors are considered to be independent variables that cumulatively affect the game event result, which is considered to be the dependent variable. Using the actual game events as data, one can then generate a system of linear equations wherein distinct, unknown coefficients multiplied by each of the factors form products that linearly sum to the game event result. Thus, in a single MLB season, for example, with 24 factor/variable categories (independent variables), there may preferably be approximately 6000-12,000 factor/variables cumulatively. Using the 7000 as exemplary, one could call them $\times1$, $\times2, \times3, \ldots \times7000$. Perhaps 2500 or so of these may be batters, while perhaps 100 or so were home plate umpires, for example. Obviously, the same person could be (on separate plays) both a hitter and a fielder, but each role for the player would be considered a separate variable/factor. Similarly, if the same player played both second base and shortstop at times during a season, his presence or role at each would be indicated by separate independent variables. Continuing the present example of a single MLB season, there may be approximately 200,000 plate appearances, or "plays" in the season league-wide. Thus, the system would have approximately 200,000 equations, each one having one factor state or variable state selected from within each of the 24 variable categories or factor categories, and each having a result defined by the change in run potential, say b1, b2, b3, b200,000.

With roughly 200,000 equations and approximately 7000 variables, this overconstrained system of equations will not have an exact solution, and one can therefore strive to find only "best-fit" values for the coefficients of the independent variables so as to minimize the amount of error comparing the outcomes predicted by such coefficients and the actual outcomes (the dependent variables). This may be done in a variety of ways, but one "best fit" for such a system is to calculate the "least squares" solution, namely to calculate the coefficients so as to minimize the sum of the squares of all the errors, the differences between all the calculated/predicted and actual dependent variables. The system could also be set up to be non-linear, such as where interactions between specific variables are being considered, but with the already large number of independent variables, the number and difficulty of calculating a solution would be overwhelming in this instance. Without particularly strong intuitions about where the non-linearities should be present, and therefore be represented by just a few cross-product independent variables, for example, the calculations would be staggering.

The reason for using a best-fit linear regression is that the overconstrained equation Ax=B cannot be solved for x. Our goal is to find matrix/vector x, such that Ax is as close to B as possible. In a preferred embodiment, this closeness is measured by calculating a row-by-row "error" representing the difference between Ax and B, squaring that number for each row, and then calculating the aggregate error by summing the all the squares. The "best" x is found to be the one that minimizes the sum of these squares. One way to calculate the appropriate x, is to begin with the equation Ax=B and multiply both sides on the left by $A^t$, the transpose of matrix A. This yields the equation $A^tAx=A^tB$. One can then solve for x by setting up an augmented matrix $[A^tA|A^tB]$ and performing Gauss-Jordan elimination. As we will see later, however, the inverse of $A^tA$ is also of great importance when we calculate the standard errors. Therefore, we can kill two birds with one stone, by augmenting the system further: $[A^tA|A^tB|I_m]$, where $I_m$ is the square identity matrix having m rows and columns. As we perform the G-J elimination, the solution x and the inverse of $A^tA$, simultaneously emerge.

Even with the linear model suggested and the relatively simple least squares best fit solution, both of which are preferred embodiments of the invention, the number of calculations necessary to obtain the coefficient values is enormous, particularly if more than a single season of MLB play is to be considered in a single model. More than a single MLB season is a preferred embodiment because a single season by itself involves relatively less interplay or "mixing" of factor states than is found in multiple seasons taken together. Since there are relatively few players changing teams, for example, during a season, many MLB teams essentially start most of the same players for most of their games, providing relatively little statistical independence between the particular defensive players on a single team for a single season. Thus, the more years one combines, the better the statistical independence one can achieve, and, generally the more reliable the numbers. That said, since each factor state is considered to have a constant contributory value for the entire model, this mathematically assumes that individual factor states do not change for the entire span of time of the model. In fact, it is probable that players' abilities do change over time due to physical maturity and decline, due to refinement and deterioration of skills, due to injuries and other health concerns, and due to surgeries, medications, and possibly due to various performance-enhancers. As such, increasing the time period for a model beneficially increases the sample size (i.e., the number of plays) and also the mixing of factors (i.e., increased statistical independence of independent variables), but less optimally also finds a solution only to the average contribution level over a longer period of time, and such average does not itself identify non-random short-term performance variances. Techniques exist, however, for better identifying such variances within the larger time ranges after the preferred embodiment of the inventive method is applied. As such, most preferred embodiments include more than a single season in the baseball model and in most other sports. One of the preferred embodiments is 7 consecutive MLB seasons.

With a model for 7 consecutive seasons, there may be approximately 7000 factors/variables, or more depending on how they are defined, and approximately 1.4 million game events (plate appearances). Getting a best-fit least squares solution is no small feat because the number of calculations is very large. In particular, various linear algebra techniques may be employed to simplify the matrix calculations and bring the computations into the realm of feasibility.

Sticking with this preferred embodiment of the invention, one can define matrix A as a matrix with 1.4 million rows (plays) and 7000 columns (independent variables). Each element of the matrix A is binary, a 1 if the factor was present or indicated on the play, or a 0 if it was not. One may then create the transpose of matrix A, denoted as $A^t$. The transpose is obviously also binary and has approximately 7000 rows and 1.4 million columns. One then multiplies matrix A with matrix $A^t$ on the left to produce matrix $A^tA$, a square matrix of approximately 7000 rows and columns. This matrix essentially represents a cross of the various factors and tallies the number of times each of two factors were both present in a play. In this manner, the multiplication of two matrices each having about 10 billion binary elements results in a single square non-binary matrix having approximately 50 million elements. The calculation time may be significant if standard matrix multiplication algorithms are employed, but the time can be made more reasonable through an indexing of non-zero entries in the very large binary matrices. Also, there may be substantial savings in the memory used by the program through indexing. Since the vast majority of entries (all but about 24 entries out of each row of 7000) are zero, most of the element multiplications result in a zero and are therefore unnecessary. By indexing the non-zero entries, a far smaller number of calculations are necessary. Indexing permits the matrix to be represented in a more compact fashion—instead of requiring a full rectangular array that is mostly full of zeroes, for each non-zero entry in the matrix, one need only indicate the column number, row number, and value of the entry. In particular, each row representing a play, one of the 1.4 million plays, will have 7000 entries on the independent side of the equation and 1 entry on the dependent side of the equation, but only 24 of the 7000 will be non-zero and the 24 will all be 1, to indicate the presence of a particular player/state for each of the 24 variable/factor categories. As such, the entirety of the information contained in that row can be captured by a 25-element sequence of numbers comprising the 24 integers that represent the column numbers having the "1" entries on the independent side of the equation and the $25^{th}$ element that is the (typically non-integral) value of the dependent variable for such play (e.g., the net increase or decrease in run potential resulting from the play).

Because what is done to one side of an equation must also be done to the other in order to preserve the equation, in similar fashion, the 1.4M×1 matrix B representing the 1.4M run potential differentials that are the game event results (dependent variable) must also be multiplied on the left by $A^t$, thereby obtaining the 7000×1 matrix $A^t B$. To attain the best-fit least squares solution, one needs to then "divide" $A^t B$ by $A^t A$, which actually involves multiplying $A^t B$ on the left by the inverse of $A^t A$. This may be accomplished through the Gauss-Jordan elimination process discussed above. While calculating this inverse may require enormous amounts of time by some techniques, such as by the use of determinants, the task can be brought to a manageable level by using Gauss-Jordan elimination on the $A^t A$ matrix to attain the identity matrix (I) while simultaneously performing the same calculations on the (I) matrix to attain the $(A^t A)^{-1}$ matrix, as discussed above. Even with using Gauss-Jordan elimination, however, since this is a 7000×14000 matrix, this calculation still may take several days on modern personal computers under good operating conditions.

After the matrix $(A^t A)^{-1}$ is calculated and then multiplied by $A^t B$, one obtains the solution matrix X, which is a 7000×1 matrix and contains the coefficients associated with the 7000 independent variables. These coefficients represent the best-fit estimation of the contributions of these variables to the outcomes (game event results) with which they are associated. Since the run potential differentials of the B matrix average out to 0 (since their sum total is the amount of runs above or below the amount of runs actually scored in the league) by definition, so too will the variable coefficients when weighted for their associated number of plate appearances. This is also why no constant is needed in the A matrix if the run potentials are calculated correctly.

Every variable has a calculated coefficient, but they are not all equally valid or reliable. A player who played just one play as a second baseman, for example, may have an extremely high or low coefficient at such position, if say, a double play or home run occurred on his one play. Even with a larger number of plays, if the plays are not relatively statistically independent from all the other independent variables, the coefficient will be less reliable as a good measure of the player's ability at the position. For example, if a particular shortstop and second baseman almost always played together defensively, and each rarely played when the other was not playing, their two variables would be tied together closely, and one could infer only very limited information about their individual contributions, though more information might be obtainable in theory about their joint contribution. In fact, in the extreme example of two players or other factors having exact overlap of plays, the A matrix and/or $A^t A$ matrix becomes singular and non-invertible, thus making calculations impossible. When such occurs, it may be remedied by making trivial changes to the data that merely avoid the singularity. More generally, as the statistical independence of different factor pairs varies, to measure the strength or reliability of the various calculated coefficients, one may preferably calculate the standard error associated with each of them.

It is also important to note that since each play by definition has a single variable present for each variable category (e.g., there is always exactly 1 pitcher, exactly 1 hitter, exactly 1 home plate umpire, etc.), the best fit solution for the coefficients will be "free-floating" for each category unless there are one or more "plays" that serve to tie the resultant coefficients down ("tie-down lines"). While other methods may be chosen, it is considered a preferred way to tie the weighted average of each factor category down to zero such that the average factor contribution in each category will neither positively nor negatively affect the expected run potential on each play, and factors that do positively or negatively contribute will have coefficients whose magnitudes are proportion to others in the same category as to the degree of their relative positive and negative contributions.

Calculating the standard error of coefficients derived from a linear regression is known in the art and entails, among other things, calculating the correlation coefficient of the original matrix equation Ax=B, and also, for each coefficient, calculating the correlation coefficient of a "diminished regression" where the B vector is replaced by the column of the A matrix corresponding to such coefficient, with that column being removed entirely from the A matrix by virtue thereof. Then, for the $i^{th}$ independent variable $x_i$, the corresponding standard error, $se_i$, is equal to the $(s_y/s_i)*[(1-R_y^2)/((1-R_i^2)(N-M-1))]^{1/2}$, wherein $s_y$ is the sample standard deviation of the dependent variable; $s_i$ is the sample standard deviation of $x_i$; $R_y^2$ is the square of the correlation coefficient of the main regression Ax=B; $R_i^2$ is the square of the correlation coefficient of the $i^{th}$ diminished regression (wherein column x, from the $i^{th}$ column of A is removed from A and replaces the dependent vector B); N is the number of observations, plays or rows; and M is the total number of independent variables. Confidence intervals may optionally be calculated from the standard errors as is known in the art. Another explanation of standard error calculations follows:

Standard Errors for Regression Coefficients

Regression Definitions
    M=the number of independent variables
    N=the number of observations
    $x_i$=the $i^{th}$ independent variable
    y=the dependent variable
    $b_i$=the regression coefficient for $x_i$
    $s_y$=the standard deviation of y
    $s_i$=the standard deviation of $x_i$ R-Squared Definitions
    $\bar{y}$=the mean of the dependent variable
    $y_j$=the value of the dependent variable on the $j^{th}$ observation
    $\hat{y}_j$=the modeled (sometimes called "predicted") value of the dependent variable on the $j^{th}$ observation Error Sum of Squares $$ESS = \sum_{j=1}^{N} (y_j - \hat{y}_j)^2$$

Total Sum of Squares $$TSS = \sum_{j=1}^{N} (y_j - \bar{y})^2$$

R-Squared $$R^2 = 1 - \frac{ESS}{TSS}$$

Main Regression and Diminished Regression
We write $R_y^2$ to mean the R-squared for the "main regression."

We write $R_i^2$ to mean the R-squared for the regression formed by replacing y with $x_i$. We refer to this regression as the "$i^{th}$ diminished regression".

Standard Error $se_i$=the standard error of the independent variable $x_i$ and is calculated as follows:

$$se_i = \frac{s_y}{s_i} \cdot \sqrt{\frac{1-R_y^2}{(1-R_i^2)(N-M-1)}}$$

Finding $R_i^2$

All components of the standard error formula are calculated directly from matrices already available in the computer program that runs the model, with the exception of R.

To find $R_i^2$, we need to calculate ESS and TSS for the $i^{th}$ diminished regression.

1. TSS is directly calculated from already available data.
2. ESS has two components:
   (a) the values of the dependent variable, which are already available.
   (b) the modeled values, which require further calculation.

To determine these modeled values, we need the diminished regression coefficients. Ordinarily, one finds regression coefficients by running a regression, but in this case it would require running M many additional (diminished) regressions.

However, the diminished regression coefficients can be calculated using information already found in the main regression. Specifically, we use $(A^tA)^{-1}$, where A is the N×M matrix on the left side in the original linear system A|b.

Let $J=(A^tA)^{-1}$ from the main regression.
Let $J_{ki}$ be the entry of J in the $k^{th}$ row and $i^{th}$ column.
Let $c_{ki}$ be the $k^{th}$ coefficient of the $i^{th}$ diminished regression. Then, for $k \neq i$, $c_{ki}$ can be found as follows.

$$c_{ki} = -\frac{J_{ki}}{J_{ii}}$$

(Note: We may view the coefficient $c_{ii}$ as either omitted or set equal to zero, provided we are consistent with our matrix sizes. For this discussion, it is retained and we let $c_{ii}=0$.)

Now, let $C_i$ be the M×1 column matrix of coefficients from the $i^{th}$ diminished regression. That is, $$C_i = \begin{pmatrix} c_{1i} \\ c_{2i} \\ \vdots \\ c_{M_i} \end{pmatrix}$$

Let $\hat{X}_i$ be the N×1 column matrix of modeled values for the $i^{th}$ diminished regression.

Then, the modeled values are found using the following matrix multiplication:

$$\hat{X}_i = AC_i$$

ESS for the diminished regression can now be calculated, and therefore $R_i^2$ may be calculated as well.

Once one has computed the coefficient and standard error associated with each of the 7000 variables, he may then optionally and preferably employ Bayesian conditional probability theory to calculate for each variable the maximum likelihood estimator for such variable. The theory behind doing so is that, even before calculating the contribution of each variable based on a sampling of plays (such as all the plays for 7 consecutive seasons), there is a presumed, expected distribution of variables within each of the factor categories. In one preferred embodiment, such presumed distribution within a factor category is a normal distribution centered at zero and having a pre-determined standard deviation that may be calculated or estimated based on the calculated standard deviation of variables within a factor category. Using such presumed distribution for a factor category and a distribution determined by the calculated coefficient and standard error for a particular variable, one may then add or preferably multiply the distributions (or density functions) to achieve a resultant, Bayesian distribution, the peak of such resultant distribution being the maximum likelihood estimator (MLE) for such variable. This may be calculated by multiplying the two y-values (probability densities) for each x-value and then optionally dividing by the area under the total curve so that a new Bayesian product density curve is obtained. This resultant curve has a mean/median/mode (MLE), and also has a standard deviation associated with it representing the spread of the curve and providing optionally calculable confidence intervals. Alternatively quartile boxes or any other percentile values may be calculated by accumulating the density curve into a distribution function.

In at least one preferred embodiment, the mean (M) and variance (V) of the resultant curve can be calculated as a function of $m_1$=the mean of the underlying distribution, $v_1$=the variance of the underlying distribution, $m_2$=the computed coefficient, and $v_2$=the square of the computed standard error. In particular, $M=(m_1*v_2+m_2*v_1)/(v_1+v_2)$ and $V=(v_1*v_2)/(v_1+v_2)$.

Using this method, one can calculate the least-squares estimate for the coefficient, standard error, and then MLE for each variable in the model, such as the 7000 in the example from above. The coefficient represents the best guess at the variable contribution to each game play event without regard to any prior known or suspected distribution of such, while the MLE accounts for the underlying distribution and essentially adjusts the calculated coefficient based on the relative strength of the model and the underlying knowledge. For many applications, the coefficient or MLE will represent the best and most useful estimation of the variable contribution.

While one preferred embodiment of the invention involves a single regression including all the variable categories that are identified in a system, there are other preferred embodiments where certain variable categories may be considered to be relatively unrelated to others such that their inclusion in the model may be more likely to introduce statistical randomness ("noise") than to increase confidence (lower standard error) in the calculated coefficients of the others. Where appropriate, one way to address such situations is through more sophisticated models, such as those where the contributions of some variables may be better estimated in multi-stage models where certain variable categories may be handled in first or second sequential regressions, for example, with the results of the first regression being used to adjust inputs (such as the dependent variable) to the second regression. For example, in a preferred embodiment pertaining to baseball, the defensive variables for the first baseman, second baseman, third baseman, shortstop, left fielder, center fielder, and right fielder may be prejudiced by randomness (noise) to a less desirable degree if the plays where virtually no defensive contribution from them is possible are considered in the regression. More specifically, one might intuit that the defensive contribution of a first baseman does not factor in significantly to a play result wherein the batter hits a home run or strikes out or walks (though it certainly could factor in very slightly, such as by dropping foul pop flies). In sabermetric terms, such plays are sometimes referred to as defense-independent play results, whereas plays such as a ground out to shortstop would be defense-dependent. Since home runs especially, but even strike outs, walks, hit batsman, and other "defense-independent" play results appear to be more prejudicial than probative in many instances in calculating a defensive player's coefficient or MLE, such defense-independent plays may therefore be optionally removed from the matrix equation to determine such values. Once that step is completed, the defensive variables may then be substituted for in a subsequent matrix equation with the coefficients or MLE values calculated in the prior model. Thus a two-stage or multi-stage process may be employed wherein different ones of the variable categories may be estimated in different stages of a multi-stage matrix equation. In a preferred embodiment, for example, a model using all defense-dependent plays only (about 70% of the total plays in MLB) may be used to calculate the variable coefficients within the 7 defensive position categories that are not pitcher and catcher (as these may relate more directly to defense-independent plays). After the variable coefficients in these categories are all estimated, either straight from the calculated least-squares coefficients, or preferably after calculating the Bayesian MILE, these numbers are substituted for the 7 variable categories in a subsequent model that uses all plays, both defense-dependent and defense-independent, such that the other 17 variables in our 24-variable model are estimated through a second least-squares equation and optionally through a subsequent Bayesian MLE calculation.

Once all of the variables have been estimated, these numbers provide very useful insight into the relative contributions of each of the factors on the game result on an average play basis. Very usefully, the contributions of all factors are in the same unit of measurement such that the values can be meaningfully compared to one another. In the baseball example above, for example, a Major League batter whose coefficient is estimated to be 0.05 above another batter is estimated to contribute that many more runs toward his team's total for every offensive plate appearance he makes. Over a 600 plate appearance season, that would be an extra 30 runs, which on average might win the team an extra 3 games (conventional sabermetric statistics indicate that either scoring an additional 10 runs per season or limiting opponents to scoring 10 fewer runs per season increases the number of expected wins for the season by about 1). Meanwhile, a first baseman whose defensive coefficient is 0.004 lower (lower is better for defense because that contributes negatively to the run potential of the offense) than another first baseman, over about 5000 defensive plate appearances in a season, will contribute 20 runs to his team (by denying the other team the 20 additional runs they would likely have scored had the other first baseman been playing defense), or about 2 additional wins.

In addition to both offensive and defensive contributions for the players (and hitters and pitchers can be broken down into versus lefties and versus righties if the categories are set up this way), contributions of other factors are also computed this way. For example, some home plate umpires tend to produce higher scoring games than others, presumably for reasons such as having a tighter strike zone. Not surprisingly in a sport with fairly loosely defined playing field dimensions beyond the four corners of the diamond, some ballparks yield more runs and some yield less. There are also contributions from the air temperature at game time. Plate appearances are influenced by how many times the batter has already faced the pitcher in the game, and various other factors. Embodiments of the invention can calculate least-squares coefficients and standard errors for variables in these and other variable categories, and thereby inform us about the relative contributions of each toward game results. In particular, the results relating to player's offensive and defensive skills, including pitching, are believed to be very valuable in assessing the worth of a player and how much a team should be interested in adding or removing a player from a team, whether the player should get increased or decreased playing time at a particular position or in a particular role (such as pinch-hitter or designated hitter), and other similar strategy decisions of a team general manager, manager, or head coach. Improved knowledge about other factors, such as how much batting against the same pitcher in a game each additional time affects the probabilistic outcome can greatly increase the manager or coach's ability to make sound strategic decisions in a game.

Furthermore, a program that substitutes calculated coefficients or MLE values back in for the independent variables, or subtracts them off the dependent variable, can be used to calculate "splits". Such splits in the above-described baseball example might include a certain hitter's contribution when he faces left-handed pitchers versus right-handed pitchers, or perhaps how he did specifically in 2008 plate appearances as opposed to those plate appearances that occurred in other years in the model (a model may often include data from multiple seasons). Perhaps one home plate umpire contributes differently to the expected run potential change of a play depending upon whether it's a day game or a night game, or depending upon whether it's early or late in the game based on the inning. A myriad of examples of extremely useful and interesting splits is possible by such substitution back into the original matrix with the calculated coefficients or MLE values and then resolving for a single variable (and typically using the mean value or least squares value since it will still typically be an overconstrained system with multiple equations for a single remaining variable).

Another fine application and preferred embodiment of the invention is for basketball, such as applied to National Basketball Association (NBA) players. Because basketball is such a team-oriented game, with lots of passing and other interaction on offense and coordinated team defenses, it is very difficult to fairly assess the actual contribution of individual players toward winning, despite the fact that many statistics exist to document the accomplishments of the individuals. Scoring points through field goals and free throws, achieving offensive and defensive rebounds, steals, blocks, and assists are all examples of such, but how does one know whether a player who averages 15 points per game, 8 rebounds per game, and 5 assists per game is more or less valuable than someone who averages 8 points, 10 rebounds, and 6 assists? Throw in the number of missed shots, turnovers, fouls, and so forth, and the analysis becomes quite complex. Even if one can estimate the relative value of a generic point scored, shot missed, foul committed, etc., and one can therefore get a better estimate of a player's contribution, that calculation still ignores, and does not normalize for, the competence of his teammates, the particular stadium he is playing in, and whether the referees are more or less prone to calling fouls and infractions (travelling, time violations), for example.

As such, one can model basketball similarly to baseball. In a preferred embodiment, the game event result is the point result of a single possession of the basketball, namely the points over or under the average number of points an average team in the league scores on an average possession. Like in baseball, an alternative game event result could be the result of an entire game, such as +1 or −1 for a win or a loss, or positive or negative number representing the margin of victory/defeat. The variable categories might include, for example, the identities of the 5 players on offense and 5 players on defense, either without regard to specific position or broken down by specific positions, such as a point guard (1), a shooting guard (2), a small/shooting forward (3), a power forward (4), and a center (5). Each real player could have distinct offensive and defensive contributions. In addition to the identities of the players, other variable categories could include the identities of the coaches and referees, the stadium/arena and whether the game is home/away for each player, the time of day at which the game started, the time remaining in a quarter or in the game, the number of minutes the player (or others) had played in the game, the state or difference of the score, etc.

The above-described methods, whether pertaining to baseball, basketball, or any other game, may be programmed into and carried out on a machine, such as a computer, or may be programmed onto a machine- or computer-readable medium such as a CD-ROM or a hard drive. The calculated coefficients, standard errors, estimators and other relevant numbers may beneficially be displayed onto a computer screen into an organized format, such as in a spreadsheet-type application. Advantageously, a spreadsheet display of such numbers permits and facilitates sorting and ordering of such data to better enable a user to understand the results and thereby better understand the degree to which different factors, such as players, contribute to a team's performance. A graphical user interface permits the presentation of data in useful ways and also permits the post-operative manipulation of such data to represent actual player contributions or averaged player contributions. The method may also be used to generate printed reports in similar fashion. In one embodiment of the invention, the method can be used to produce single- or multiple-sheet portfolios pertaining to a single factor, summarizing the various contributions of such factor over a designated span of time. For a player, for example, this might look somewhat like a "baseball card", similar to those made historically by companies such as Topps and Fleer, although the numerical and textual content would focus more on the coefficients, standard errors, and estimators discussed above, and less on the traditional baseball statistics used on past baseball cards. Such portfolios can be rendered using the inventive methods for baseball, basketball, or any other game where involving contributions from multiple game factors. The portfolios can be manually organized by individuals to facilitate, for example, the staffing and organization of personnel on a team in a competitive sport.

In particular, the general manager or head of game operations for a professional sports franchise would find such things very useful in making decisions about which players to sign, which players to draft, and which players to trade and trade for. Related thereto, they would also be significantly benefitted by knowing how much money to be willing to spend on a particular player relative to other options that might exist. Similarly, someone consulting to a professional sports organization in this regard would find the invention extremely useful and beneficial. For baseball particularly, the ability to evaluate, among other things, a truly objective defensive contribution from players marks a very significant improvement over the current state of the art. It is believed to be the only system that uses all available play data where the player was involved in the game, regardless of the extent to which the player did or did not contribute to the result of the play using conventional statistics. This is very important because there are presently no ways to value this. Thus, if a particular shortstop is so good defensively that he makes the other infielders look better by conventional statistics, there is no way to measure this influence conventionally. The methods described herein, however, account for the presence of that particular shortstop on each play and thus his influence is properly credited to him (even if he never touches the ball on the play), and the second baseman, for example, has his numbers also represent a true estimation of just his independent ability to contribute to a play without the skills of the shortstop causing him to appear significantly better or worse than he is. The methods also reject subjective notions of "errors" and the like in favor of contributions toward an end result of the game, such as scoring a run/point or winning the game.

All the factors are preferably measured in universal units of measurement (such as the "run" in baseball or the "point" in basketball), so they can be fairly compared to one another. The system uses no arbitrary constants often used by sabermetricians to make things "look good", such as independently calculating a players offensive runs contributed using one type of model and defensive runs contributed using another model and baserunning runs contributed using yet another model, placing or converting all into a common currency (such as the run) if they weren't already, and then adding them. No other known system uses the same model to calculate, for example, offensive and defensive contribution of the same player from the same comprehensive model, and such is possible with the inventive methods. Furthermore, the same comprehensive model also generates extremely valuable insights into other non-player factors, such as ballpark or court effects, the effects of umpires/referees, managers/coaches, etc.

A flowchart illustrating one embodiment of the invention follows below, including steps such as getting data, converting data, choosing categories, reading in variables, assigning variable names, etc. The flowchart particularly points out one example of the sequencing of inputs, the formation of files/matrices from the inputs, and the generation of desirable outputs that are themselves valuable or then become inputs to a subsequent process.

Description of Flowchart:

FIG. 1 is a drawing providing a flowchart illustrating one embodiment of the invention, with reference numerals identified as follows:

1. Game Data contains information about each play of a baseball game. Such data is accumulated and organized by companies like Stats Inc. and Retrosheet among others.

2. Roster Information contains the names of players who played for each team during a given season. This data is typically available wherever Game Data is found.

3. Master ID Creator takes Roster Information and produces a list of every new player that was on an active roster at some point during a given season. Each player is given a Master ID number, which is the same ID number for each position. Master IDs are also produced for the other non-player factor categories.

4. Master IDs is the output from Master ID Creator.

5. Creation of Play-by-Play Data formats the Game Data to suit our programming needs. Some of the Game Data is omitted, while some new fields are calculated from existing ones.

6. Attach Master IDs, in conjunction with Creation of Play-by-Play Data, creates Play-by-Play data for each year. Each player (at each position) is matched with his Master ID number.

7. Play-by-Play files as described above may preferably contain every play of a full season of baseball.

8. Calculate Run Potentials and Attach them. The run potentials (RP) are calculated for a season by analyzing that season's Play-by-Play file. The change in RP for each play is calculated and then attached to the Play-by-Play file. The result is the following:
9. Play-by-Play with RP change.
10. Setup Instructions. For each run, there are instructions necessary to correspond to model options (e.g. which variables to include, which years to include, etc.). The instructions are contained in this file, which gets fed into the first step of the actual run.
11. Matrix Creation is the step where matrices are created in preparation for the Gauss-Jordan step.
12. Variable Map. Not all Master ID's are used in each run. The variable map is the list of only the variables from this run.
13. PA. is a list of the number of Plate Appearances from each independent variable. Plate Appearances are the observations or rows in which each variable occurs. In some embodiments, observations can be something other than plate appearances.
14. A|b is the linear system that will ultimately be regressed. It is also used in the standard error step.
15, 16. $A'A$ and $A'B$ represent the first step in algebraically finding the coefficients of the regression.
17. Gauss-Jordan (GJ) represents the row-reduction or elimination process that transforms $[A'A|A'B|I]$ into $[I|x|(A'A)^{-1}]$.
18. $(A'A)^{-1}$ is output from GJ which is used in calculating the standard errors.
19. x is the "best-fit" solution to Ax=b.
20. Standard Errors (S.E.) produces not just the standard errors, but also other output necessary for finding an adjusted "Bayes" coefficient.
21-23. Standard Deviation (Std. Dev), Standard Error (S.E.), and the Mean are produced n the S.E. step. Std. Dev. is for a category. Mean is for a category. Standard Error is for an individual variable.
24. Bayes is the process by which we multiply the underlying distribution of the category (depends on Std. Dev. and Mean of the category) with the specific variable distribution (depends on S.E. and x of the variable) to create a maximum likelihood estimate (MLE) or "Bayes number".
25. x (Bayes) is the "Bayes number" (MLE) output from the Bayes step.

The embodiments described above are exemplary of preferred embodiments only and are not intended to be an exhaustive representation of the scope of the invention. For example, in addition to baseball or basketball, the inventive methods could be applicable to team sports including football, hockey, and soccer; the team game events could be single games or entire seasons of games for a team; and the results could include actual points scored, potential points increased, binary outcomes, such as win/loss or hit/miss, and any continuous or discrete data. The inventive method can include factor categories representing multiple distinct positions on a team or can be adapted to include multiple individuals/states having common positional designation or lacking such designations. The invention is defined in the following claims.

What is claimed is:

1. A method of evaluating the contributions of individual game factors from a plurality of factor categories, said method including the following steps:
   identifying a plurality of team game events that each has at least one quantifiable team game event result;
   identifying a plurality of factor categories relevant to at least some of said team game events, wherein said plurality of factor categories each take at least one of a plurality of pre-defined category-specific factor states, at least one of said category-specific factor states being defined by the participation of said individual factor in said event results, where the number of identified team game events exceeds the total number of said category-specific factor states among all said factor categories;
   identifying a subset of said plurality of factor categories that do not substantially affect a subset of said plurality of team game events;
   calculating a best-fit solution to a system of equations using said category-specific factor states among all factor categories as independent variables and said quantifiable event results as dependent variables, said system of equations reflecting only team game event results not in said subset of said plurality of team game events, said solution assigning a contribution value to at least one of said category-specific factor states, each said contribution value representing an estimation of the contribution of the corresponding category-specific factor state toward each of said event results having said category-specific factor state present during said event;
   calculating a best estimation value for at least all factor states in said subset of said plurality of factor categories, using at least the calculated contribution values corresponding to said factor states;
   calculating, using a computer, a best-fit solution to a system of equations using said category-specific factor states among all factor categories, except for said subset of said plurality of factor categories, as independent variables and said quantifiable event results as dependent variables, wherein said best estimation values for said subset of said plurality of factor categories are substituted in for said corresponding independent variables to reduce the number of independent variables in said system, said solution assigning a contribution value to at least one of said category-specific factor states not in said subset of factor categories, each said contribution values representing an estimation of the contribution of the corresponding category-specific factor state toward each of said game event results having said category-specific factor state present during said event; and
   calculating the best-fit solution to a system of equations using said category-specific factor states further comprising display onto a computer screen into an organized format with machine-readable medium facilitating sorting and ordering of said quantifiable event results to generate reports.

2. A programmed computer for evaluating the contributions of individual game factors toward a plurality of team game event results, said programmed computer being programmed to:
   identify a plurality of team game events that each has at least one quantifiable team game event result;
   identify a plurality of factor categories relevant to each of said team game events, wherein said plurality of factor categories each take at least one of a plurality of pre-defined category-specific factor states, at least one of said category-specific factor states being defined by the participation of said individual factor in said event results, where the number of identified team game events exceeds the total number of said category-specific factor states among all said factor categories;
   calculate a best-fit solution to a system of equations using said category-specific factor states among all factor categories as independent variables and said quantifiable event results as dependent variables, said solution assigning a contribution value to at least one of said category-specific factor states, each said contribution value representing an estimation of the contribution of the corresponding category-specific factor state toward each of said event results having said category-specific factor state present during said event.

3. A programmed computer in accordance with claim 2 wherein said team game is baseball.

4. A programmed computer in accordance with claim 3 wherein one of said factor categories is the identity of the batter.

5. A programmed computer in accordance with claim 4 wherein one of said factor categories is the identity of the pitcher.

6. A programmed computer in accordance with claim 3 wherein one of said factor categories is the identity of an individual defensive player.

7. A programmed computer in accordance with claim 3 wherein one of said factor categories is the identity of the home plate umpire, either manager or the ballpark.

8. A programmed computer in accordance with claim 2 wherein said team game is basketball.

9. A programmed computer in accordance with claim 8 wherein one of said factor categories is the identity at least one offensive player.

10. A programmed computer in accordance with claim 8 wherein one of said factor categories is the identity at least one defensive player.

11. A programmed computer in accordance with claim 8 wherein one of said factor categories is the identity of the referees.

12. A programmed computer in accordance with claim 8 wherein one of said factor categories is the identity of either head coach.

13. A programmed computer in accordance with claim 8 wherein one of said factor categories is the identity of the arena.

14. A programmed computer in accordance with claim 2 wherein said team game events are individual plays within a game.

15. A programmed computer in accordance with claim 14 wherein said plurality of team game events includes at least all the plays in one game.

16. A programmed computer in accordance with claim 2 wherein said programmed computer is further programmed to calculate the standard error associated with at least one of the plurality of pre-defined category-specific factor states among at least one of the factor categories.

17. A programmed computer in accordance with claim 16 wherein said programmed computer is further programmed to calculate a maximum likelihood estimator or other conditional probability for at least one of the plurality of pre-defined category-specific factor states using at least the contribution value and standard error associated with such pre-defined category-specific factor state.

18. A programmed computer for evaluating the contributions of individual game factors toward a plurality of team game event results, said programmed computer being programmed to:
identify a plurality of team game events that each has at least one quantifiable team game event result;
identify a plurality of factor categories relevant to at least some of said team game events, wherein said plurality of factor categories each take at least one of a plurality of pre-defined category-specific factor states, at least one of said category-specific factor states being defined by the participation of said individual factor in said event results, where the number of identified team game events exceeds the total number of said category-specific factor states among all said factor categories;
identify a subset of said plurality of factor categories that do not substantially affect a subset of said plurality of team game events;
calculate a best-fit solution to a system of equations using said category-specific factor states among all factor categories as independent variables and said quantifiable event results as dependent variables, said system of equations reflecting only team game event results not in said subset of said plurality of team game events, said solution assigning a contribution value to at least one of said category-specific factor states, each said contribution value representing an estimation of the contribution of the corresponding category-specific factor state toward each of said event results having said category-specific factor state present during said event;
calculate a best estimation value for at least all factor states in said subset of said plurality of factor categories, using at least the calculated contribution values corresponding to said factor states; and
calculate a best-fit solution to a system of equations using said category-specific factor states among all factor categories, except for said subset of said plurality of factor categories, as independent variables and said quantifiable event results as dependent variables, wherein said best estimation values for said subset of said plurality of factor categories are substituted in for said corresponding independent variables to reduce the number of independent variables in said system, said solution assigning a contribution value to at least one of said category-specific factor states not in said subset of factor categories, each said contribution values representing an estimation of the contribution of the corresponding category-specific factor state toward each of said game event results having said category-specific factor state present during said event.

19. A programmed computer in accordance with claim 18 wherein said programmed computer is further programmed to calculate the standard error associated with at least one of the plurality of pre-defined category-specific factor states among at least one of the factor categories and calculating a maximum likelihood estimator for at least one of the plurality of pre-defined category-specific factor states using at least the contribution value and standard error associated with such pre-defined category-specific factor state, and wherein said best estimation value for at least all factor states in said subset of said plurality of factor categories is the maximum likelihood estimator associated with such factor state.

20. A programmed computer in accordance with claim 18 wherein said programmed computer is further programmed to calculate the best-fit solution to a system of equations using said category-specific factor states and comprises display onto a computer screen into an organized format with machine-readable medium facilitating sorting and ordering of said quantifiable event results to generate reports.

\* \* \* \* \*